US011949152B2

(12) United States Patent
Li

(10) Patent No.: US 11,949,152 B2
(45) Date of Patent: Apr. 2, 2024

(54) ANTENNA DEVICE AND ELECTRONIC DEVICE

(71) Applicant: GUANGDONG OPPO MOBILE TELECOMMUNICATIONS CORP., LTD., Dongguan (CN)

(72) Inventor: Si Li, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 224 days.

(21) Appl. No.: 17/559,639

(22) Filed: Dec. 22, 2021

(65) Prior Publication Data

US 2022/0115778 A1    Apr. 14, 2022

Related U.S. Application Data

(63) Continuation of application No. PCT/CN2020/110840, filed on Aug. 24, 2020.

(30) Foreign Application Priority Data

Aug. 30, 2019    (CN) .......................... 201910818037.8

(51) Int. Cl.
  *H01Q 1/36*    (2006.01)
  *H01Q 1/24*    (2006.01)
  (Continued)

(52) U.S. Cl.
  CPC .............. *H01Q 1/36* (2013.01); *H01Q 1/243* (2013.01); *H01Q 1/44* (2013.01); *H01Q 1/48* (2013.01); *H01Q 21/0006* (2013.01); *H04B 5/70* (2024.01)

(58) Field of Classification Search
  CPC ...... H01Q 1/243; H01Q 5/314; H01Q 1/2291; H01Q 7/00; H04B 5/02
  See application file for complete search history.

(56) References Cited

U.S. PATENT DOCUMENTS 9,608,709 B1    3/2017  Kinamon et al.
2017/0338541 A1*  11/2017  Tsai ....................... H01Q 1/243
(Continued)

FOREIGN PATENT DOCUMENTS

CN    104143683 A    11/2014
CN    105940550 A    9/2016
(Continued)

OTHER PUBLICATIONS

International Search Report and the Written Opinion dated Nov. 27, 2020 From the International Searching Authority Re. Application No. PCT/CN2020/110840, 15 pages.
(Continued)

*Primary Examiner* — Dimary S Lopez Cruz
*Assistant Examiner* — Aladdin Abdulbaki
(74) *Attorney, Agent, or Firm* — BAYES PLLC

(57) ABSTRACT

An antenna device and an electronic device are provided. The antenna device includes a near field communication chip for supplying a differential excitation current, a ground plane forming a conductive path, a first conductor structure, and a second conductor structure. The first conductor structure, conductive path, and second conductor structure collectively form a conductive loop for transmission of the differential excitation current.

18 Claims, 8 Drawing Sheets

(51) Int. Cl.
*H01Q 1/44* (2006.01)
*H01Q 1/48* (2006.01)
*H01Q 21/00* (2006.01)
*H04B 5/70* (2024.01)

(56) References Cited

U.S. PATENT DOCUMENTS

| | | | |
|---|---|---|---|
| 2018/0035433 | A1 | 2/2018 | Zielinski et al. |
| 2018/0331416 | A1 | 11/2018 | Yu et al. |
| 2019/0081398 | A1* | 3/2019 | Zhou .................. H01Q 1/243 |
| 2019/0165836 | A1 | 5/2019 | Irci et al. |

FOREIGN PATENT DOCUMENTS

| | | | |
|---|---|---|---|
| CN | 106099327 | A | 11/2016 |
| CN | 107123861 | A | 9/2017 |
| CN | 107403995 | A | 11/2017 |
| CN | 108496278 | A | 9/2018 |
| CN | 110176670 | A | 8/2019 |

OTHER PUBLICATIONS

The first Office Action dated Oct. 22, 2021 from from China Application No. 201910818037.8, 10 pages.
Notice of Reexamination from Chinese application No. 201910818037.8 dated Jan. 17, 2023.
Reexamination Decision from Chinese application No. 201910818037.8 dated Mar. 2, 2023.
1 The Second Office Action dated Mar. 14, 2022 from China Application No. 201910818037.8, 11 pages.
Rejection Decision from Chinese application No. 201910818037.8 dated Jun. 6, 2022.
Extended European search report from European application No. 20855975.7 dated Aug. 9, 2022.

* cited by examiner

ANTENNA DEVICE AND ELECTRONIC DEVICE

CROSS REFERENCE TO RELATED APPLICATIONS

This application is a continuation application of an International Application No. PCT/CN2020/110840, filed on Aug. 24, 2020, which claims the benefit of priority to Chinese Application No. 201910818037.8, filed on Aug. 30, 2019. The entire disclosures of the above applications are incorporated herein by reference.

FIELD OF THE DISCLOSURE

The application relates to a field of communication technology, and in particular to an antenna device and electronic device.

BACKGROUND

With development of communication technology, functions that electronic devices (such as smart phones) can achieve have become more, and communication modes of electronic devices have become more diversified. For example, general electronic devices can support multiple communication modes, such as cellular network communication, Wireless Fidelity (Wi-Fi) communication, Global Positioning System (GPS) communication, and Bluetooth (BT) communication. In addition, with the advancement of communication technology, recently electronic devices have gradually realized near field communication (NFC).

SUMMARY

The embodiments of the present disclosure provide an antenna device and an electronic device.

In a first aspect, one embodiment of the present disclosure provides an antenna device.

The antenna device comprises a near field communication chip, a ground plane, a first conductor structure, and a second conductor structure. The near field communication chip includes a first differential signal port and a second differential signal port. The first differential signal port and the second differential signal port are configured to provide a differential excitation current. The ground plane includes a first ground point and a second ground point arranged at an interval from each other. A conductive path between the first ground point and the second ground point is formed on the ground plane. The first conductor structure includes a first feeding end and a first ground end arranged at an interval from each other. The first feeding end is electrically connected to the first differential signal port, and the first ground end is electrically connected to the first ground point. The second conductor structure includes a second feeding end and a second ground end arranged at an interval from each other. The second feeding end is electrically connected to the second differential signal port, and the second ground end is electrically connected to the second ground point. The first conductor structure, the conductive path, and the second conductor structure collectively form a conductive loop for transmission of the differential excitation current.

In a second aspect, another embodiment of the present disclosure provides an electronic device comprising an antenna device. The antenna device comprises a near field communication chip, a ground plane, a first conductor structure, and a second conductor structure. The near field communication chip includes a first differential signal port and a second differential signal port. The first differential signal port and the second differential signal port are configured to provide a differential excitation current. The ground plane includes a first ground point and a second ground point arranged at an interval from each other. A conductive path between the first ground point and the second ground point is formed on the ground plane. The first conductor structure includes a first feeding end and a first ground end arranged at an interval from each other. The first feeding end is electrically connected to the first differential signal port, and the first ground end is electrically connected to the first ground point. The second conductor structure includes a second feeding end and a second ground end arranged at an interval from each other. The second feeding end is electrically connected to the second differential signal port, and the second ground end is electrically connected to the second ground point. The first conductor structure, the conductive path, and the second conductor structure collectively form a conductive loop for transmission of the differential excitation current.

BRIEF DESCRIPTION OF THE DRAWINGS

Some example embodiments of the present disclosure will be described below in detail with reference to the accompanying drawings.

DETAILED DESCRIPTION

To help a person skilled in the art better understand the solutions of the present disclosure, the following clearly and completely describes the technical solutions in the embodiments of the present disclosure with reference to the accompanying drawings in the embodiments of the present disclosure. Apparently, the described embodiments are a part rather than all of the embodiments of the present disclosure.

All other embodiments obtained by a person of ordinary skill in the art based on the embodiments of the present disclosure without creative efforts shall fall within the protection scope of the present disclosure.

An embodiment of the present disclosure provides an electronic device. The electronic device may be a smart phone, a tablet computer, etc., or a game device, an augmented reality (AR) device, an automobile device, a data storage device, an audio playback device, a video playback device, a notebook computer, a desktop computing device, etc.

Figure 1:
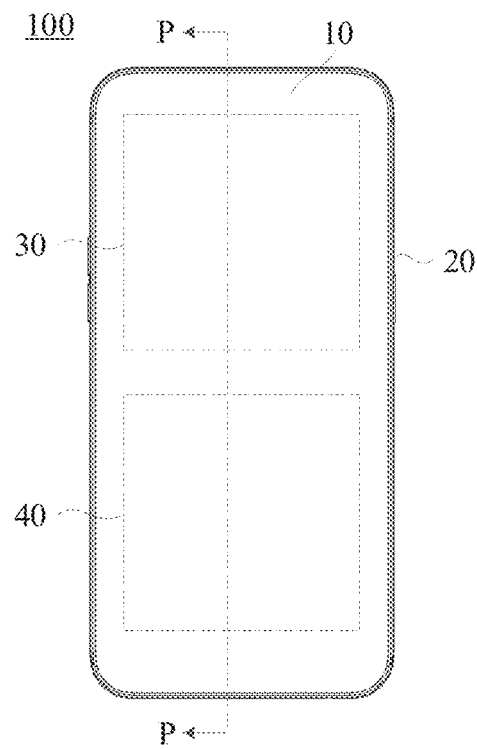
FIG. 1 is a schematic structural diagram of an electronic device according to an embodiment of the present disclosure.

Please refer to FIG. 1. FIG. 1 is a schematic structural diagram of an electronic device provided by an embodiment of the present disclosure.

The electronic device 100 comprises a display screen 10, a casing 20, a circuit board 30 and a battery 40.

The display screen 10 is arranged on the housing 20 to form a display surface of the electronic device 100 for displaying information such as images and text. The display screen 10 may comprise a liquid crystal display (LCD) or an organic light-emitting diode) display.

The display screen 10 may comprise a display surface and a non-display surface opposite to the display surface. The display surface is the surface of the display screen 10 facing the user, that is, the display surface is the surface visible to the user of the display screen 10 on the electronic device 100. The non-display surface is the surface of the display screen 10 facing the inside of the electronic device 100. The display surface is configured to display information, and the non-display surface does not display any information.

A cover plate may be arranged on the display screen 10 to protect the display screen 10 from being scratched or damaged by water. The cover plate may be a transparent glass cover plate, so that the user can observe the content displayed on the display screen 10 through the cover plate. The cover plate may be a glass cover plate made of sapphire.

The housing 20 is configured to form the outer contour of the electronic device 100 so as to contain the electronic components and functional elements of the electronic device 100, while sealing and protection effects can be provided for the electronic components and functional elements inside the electronic device. For example, all functional elements of the camera, circuit board, and vibration motor of the electronic device 100 can be arranged inside the housing 20. The housing 20 may comprise a middle frame and a battery cover.

The middle frame may have a thin plate or sheet-like structure or a hollow frame structure. The middle frame is configured to provide support for the electronic components or functional elements in the electronic device 100 so as to install the electronic components and functional elements of the electronic device 100 together. For example, several structures, such as concave slots, protrusions, and through holes may, be provided on the middle frame to facilitate the installation of the electronic components or functional elements of the electronic device 100. The material of the middle frame may comprise metal or plastic.

The battery cover is connected with the middle frame. For example, the battery cover can be attached to the middle frame through an adhesive such as double-sided tape to realize the connection with the middle frame. The battery cover is configured to encapsulate the electronic components and functional elements of the electronic device 100 inside the electronic device 100 together with the middle frame and the display screen 10 to protect the electronic components and functional elements of the electronic device 100. The battery cover can be integrally molded. During the molding process of the battery cover, structures, such as a mounting hole for a rear camera, can be formed on the battery cover. The material of the battery cover may also comprise metal or plastic.

The circuit board 30 is arranged inside the housing 20. For example, the circuit board 30 may be installed on the middle frame of the housing 20 for fixing, and the circuit board 30 may be encapsulated inside the electronic device through the battery cover. Wherein, the circuit board 30 may be the main board of the electronic device 100. One or more of functional elements such as a processor, a camera, an earphone interface, an acceleration sensor, a gyroscope, and a motor may be integrated on the circuit board 30. At the same time, the display screen 10 may be electrically connected to the circuit board 30 to control the displaying of the display screen 10 through a processor on the circuit board 30.

The battery 40 is arranged inside the housing 20. For example, the battery 40 may be installed on the middle frame of the housing 20 for fixing, and the battery 40 may be encapsulated inside the electronic device through the battery cover. At the same time, the battery 40 is electrically connected to the circuit board 30 so that the battery 40 can supply power to the electronic device 100. The circuit board 30 may be provided with a power management circuit. The power management circuit is configured to distribute the voltage provided by the battery 40 to various electronic components in the electronic device 100.

The electronic device 100 is also provided with an antenna device 200. The antenna device 200 is configured to implement the wireless communication function of the electronic device 100. For example, the antenna device 200 may be used to implement NFC communication. The antenna device 200 is arranged inside the housing 20 of the electronic device 100. Some of the components of the antenna device 200 may be integrated on the circuit board 30 inside the housing 20. For example, a signal processing chip and a signal processing circuit of the antenna device 200 may be integrated on the circuit board 30. In addition, some of the components of the antenna device 200 may also be directly arranged inside the housing 20. For example, the radiator or conductor structure configured by the antenna device 200 to radiate signals may be directly arranged inside the housing 20.

Figure 2:
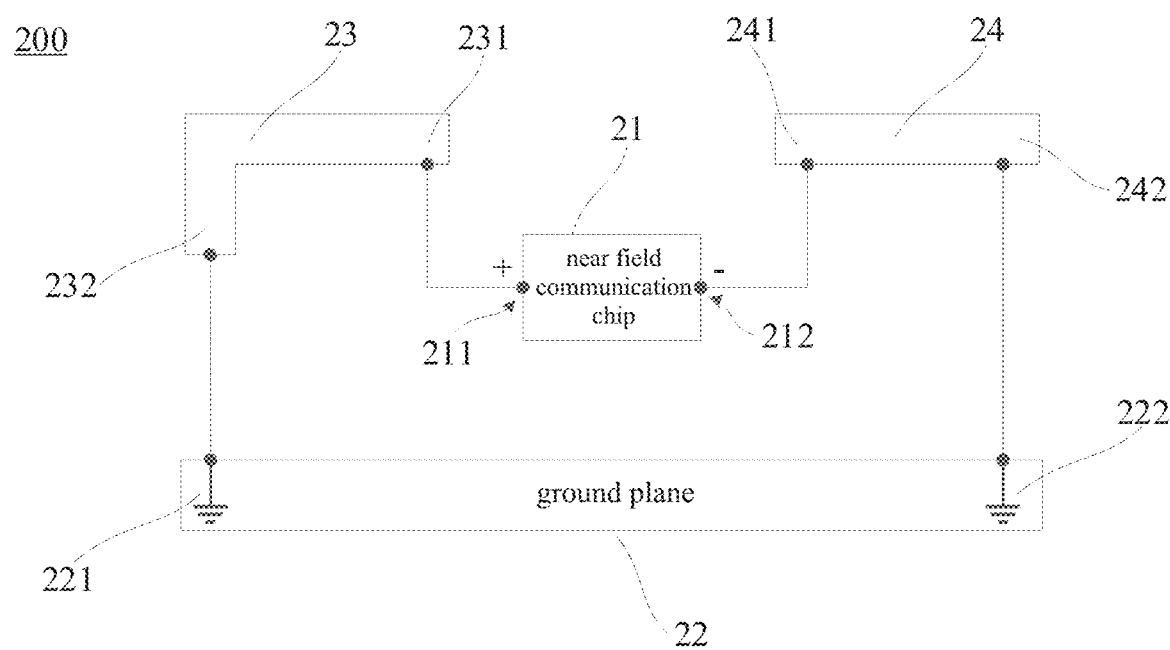
FIG. 2 is a schematic diagram of a first structure of an antenna device according to another embodiment of the present disclosure.

Please refer to FIG. 2. FIG. 2 is a schematic diagram of a first structure of an antenna device 200 provided by an embodiment of the present disclosure. The antenna device 200 comprises a near field communication chip 21, a ground plane 22, a first conductor structure 23, and a second conductor structure 24.

In the description of the present disclosure, terms such as "first" and "second" are only used to distinguish similar objects but cannot be understood as indicating or implying relative importance or implicitly indicating the number of indicated technical features.

The NFC chip 21 may be configured to provide a differential excitation current. The differential excitation current comprises two current signals. The two current signals have the same amplitude and opposite phases, or it is understood that the different of the phases of the two current signals is 180 degrees. In addition, the differential excitation current is a balanced signal. During the transmission process of an analog signal, if it is directly transmitted, it is an unbalanced signal; if the original analog signal is inverted and then the inverted analog signal and the original analog signal are transmitted at the same time, the inverted analog signal and the original analog signal are referred to as a balanced signal. The balanced signal passes through a differential amplifier during the transmission. A subtraction operation is performed on the original analog signal and the inverted analog signal to obtain an enhanced original analog signal. Since the two transmission lines are subject to the same interference during the transmission process, the same interference signal is subtracted in the subtraction operation, so the anti-interference performance of the balanced signal is better.

The NFC chip 21 comprises a first differential signal port 211 and a second differential signal port 212. For example, the first differential signal port 211 may be a positive (+) port of the NFC chip 21, and the second differential signal port 212 may be a negative (−) port of the NFC chip 21. The first differential signal port 211 and the second differential signal port 212 are configured to provide the differential excitation current. For example, the differential excitation current provided by the NFC chip 21 can be output to the antenna device 200 through the first differential signal port 211 and flow back to the NFC chip 21 through the second differential signal port 212, thereby forming a current loop.

The NFC chip 21 may be arranged on the circuit board 30 of the electronic device 100. Alternatively, a smaller independent circuit board may be arranged in the electronic device 100, and the NFC chip 21 may be integrated on the independent circuit board. For example, the independent circuit board may be a small board in the electronic device 100.

The ground plane 22 is configured to form a common ground. The ground plane 22 may be formed by a conductor, a printed wiring, or a metal printed layer in the electronic device 100. For example, the ground plane 22 may be arranged on the circuit board 30 of the electronic device 100. The ground plane 22 may be formed on the housing 20 of the electronic device 100. For example, the ground plane 22 may be formed by the middle frame of the housing 20, or the ground plane 22 may also be formed by the battery cover of the housing 20.

The ground plane 22 comprises a first ground point 221 and a second ground point 222 which are arranged at an interval from each other. The first ground point 221 and the second ground point 222 may be, for example, the end portions of the ground plane 22, or may also be protrusion structures on the ground plane 22, or may be pads formed on the ground plane 22, or may also be regions having a certain area on the ground plane 22.

The ground plane 22 forms a conductive path between the first ground point 221 and the second ground point 222, and the conductive path may be used to conduct currents. That is, when voltage signals are applied to the first ground point 221 and the second ground point 222, a current can be generated between the first ground point 221 and the second ground point 222, thereby forming a current loop. When the NFC chip 21 provides a differential excitation current, the conductive path between the first ground point 221 and the second ground point 222 can be configured to transmit the differential excitation current.

The first conductor structure 23 comprises a first feeding end 231 and a first ground end 232 which are arranged at an interval from each other. The first feeding end 231 is electrically connected to the first differential signal port 211 of the NFC chip 21, so that the first differential signal port 211 feeds power to the first feeding end 231. For example, the differential excitation current provided by the NFC chip 21 may be transmitted to the first feeding end 231 through the first differential signal port 211 to achieve feeding power to the first conductor structure 23. The first ground end 232 is electrically connected to the first ground point 221 of the ground plane 22 so as to achieve the grounding of the first conductor structure 23.

The second conductor structure 24 comprises a second feeding end 241 and a second ground end 242 which are arranged at an interval from each other. The second feeding end 241 is electrically connected to the second differential signal port 212 of the NFC chip 21, so that the second differential signal port 212 feeds power to the second feeding end 241. For example, the differential excitation current provided by the NFC chip 21 may be transmitted to the second feeding end 241 through the second differential signal port 212 to achieve feeding power to the second conductor structure 24. The second ground end 242 is electrically connected to the second ground point 222 of the ground plane 22 so as to achieve the grounding of the second conductor structure 24.

The first conductor structure 23 and the second conductor structure 24 may both be metal structures in the electronic device 100 or metal wirings on the circuit board 30. The second conductor structure 24 and the first conductor structure 23 are different conductor structures.

Figure 3:
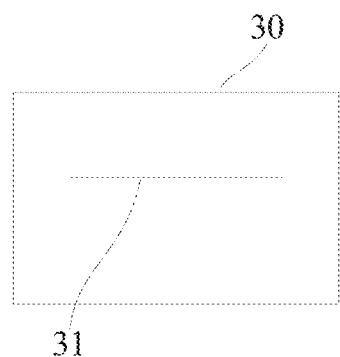
FIG. 3 is a schematic structural diagram of a circuit board of an electronic device according to an embodiment of the present disclosure.

As shown in FIG. 3, FIG. 3 is a schematic structural diagram of the circuit board 30 of an electronic device provided by an embodiment of the present disclosure. There is a printed wiring arranged on the circuit board 30 of the electronic device 100. The first conductor structure 23 may be the printed circuit 31, or the second conductor structure 24 may be the printed circuit 31.

Figure 4:
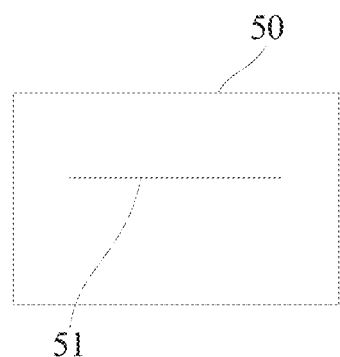
FIG. 4 is a schematic structural diagram of a flexible circuit board of an electronic device according to an embodiment of the present disclosure.

As shown in FIG. 4, FIG. 4 is a schematic structural diagram of a flexible circuit board 50 of the electronic device provided by an embodiment of the present disclosure. The electronic device 100 comprises a flexible printed circuit (FPC) 50. The FPC 50 is electrically connected to the circuit board 30. The FPC 50 may be, for example, an FPC of a display screen, an FPC of a camera, an FPC of a motor, etc., or the FPC 50 may be an independent FPC for implementing an NFC conductor structure, which may be fixed in the housing of the electronic device 100. There is a metal wiring 51 arranged on the FPC 50. The metal wiring 51 is configured to transmit signals, for example, it may be configured to transmit control signals of a display screen, a control signal of a camera, a control signal of a motor, and the like. The first conductor structure 23 may comprise the metal wiring 51, or the second conductor structure 24 may comprise the metal wiring 51.

Figure 5:
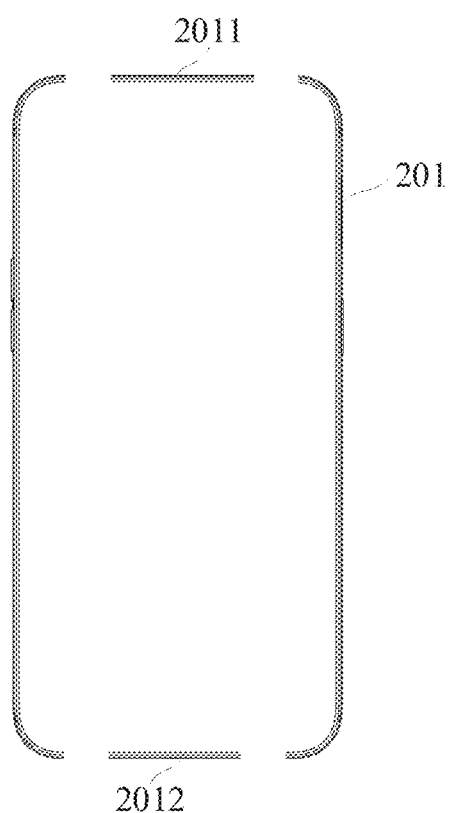
FIG. 5 is a schematic structural diagram of a middle frame of an electronic device according to an embodiment of the present disclosure.

As shown in FIG. 5, FIG. 5 is a schematic structural diagram of a middle frame 201 of an electronic device provided by an embodiment of the present disclosure. The housing 20 of the electronic device 100 comprises the middle frame 201. The circuit board 30 may be disposed on the middle frame 201. The middle frame 201 comprises a first metal branch 2011 and a second metal branch 2012 which are arranged at intervals from each other. For example, a plurality of daps may be formed on the middle frame. The first metal branch 2011 and the second metal branch 2012 are formed through the plurality of gaps. The first conductor structure 23 comprises the first metal branch 2011, and the second conductor structure 24 comprises the second metal branch 2012.

The electronic device 100 may comprise a front camera and a rear camera. Metal decorative rings may be arranged around the front camera and the rear camera. The first conductor structure 23 may comprise the decorative ring of the front camera, and the second conductor structure 24 may comprise the decorative ring of the rear camera.

The first conductor structure 23, the conductive path on the ground plane 22, and the second conductor structure 24 collectively form a conductive loop for the transmission of the differential excitation current. That is, the differential excitation current is output from one signal port of the NFC chip 21, for example, from the first differential signal port 211 and then fed into the first conductor structure 23. Then, it is transmitted to the conductive path on the ground plane 22 through the first conductor structure 23, transmitted to the second conductor structure 24 through the conductive path, and finally flows back to the second differential signal port 212 of the NFC chip 21 through the second conductor structure 24, thereby forming a complete current loop.

When the differential excitation current is transmitted in the conductive loop, the first conductor structure 23, the conductive path on the ground plane 22, and the second conductor structure 24 may collectively generate an alternating electromagnetic field, thereby radiating NFC signals outward to achieve the NFC communication of the electronic device 100.

When the differential excitation current is transmitted in the conductive loop, the first conductor structure 23 generates a first near field communication radiation field (first NFC radiation field). The first NFC radiation field may cover a certain spatial region around the electronic device 100. The second conductor structure 24 generates a second near field communication radiation field (second NFC radiation field). The second NFC radiation field may also cover a certain spatial region around the electronic device 100. Wherein, the second NFC radiation field at least partially overlaps the first NFC radiation field, thereby increasing the region of the NFC radiation field around the electronic device 100 and enhancing the field strength of the overlapping region. Therefore, the effective reading and writing (card swiping) area of the NFC antenna of the electronic device 100 can be increased, and the stability of the NFC antenna of the electronic device 100 during the reading and writing (card swiping) can be improved.

Moreover, when the differential excitation current is transmitted in the conductive loop, the ground plane 22 can generate a third near field communication radiation field (third NFC radiation field). The third NFC radiation field may also cover a certain spatial area around the electronic device 100. The third NFC radiation field at least partially overlaps the first NFC radiation field, and the third NFC radiation field at least partially overlaps the second NFC radiation field. Therefore, the region of the NFC radiation field around the electronic device 100 can be further increased, and the field strength of the overlapping region can be enhanced.

For example, in practical applications, when an NFC receiver (such as a subway card reader) is close to the position of the first conductor structure 23 to read an NFC signal, the first NFC radiation field formed by the first conductor structure 23 serves as the main radiation field, the second NFC radiation field formed by the second conductor structure 24 and the third NFC radiation field formed by the ground plane 22 can both compensate for the main radiation field, so that the position of the main radiation field where the field strength is weaker can be compensated for, thereby enhancing the field strength of the entire region of the main radiation field. Similarly, when an NFC receiver is close to the position of the second conductor structure 24 to read an NFC signal, the second NFC radiation field formed by the second conductor structure 24 serves as the main radiation field, the first NFC radiation field and the third NFC radiation field can both compensate for the main radiation field.

Therefore, the antenna device 200 of the present disclosure can ensure that in the electronic device 100, the reception and transmission of the NFC signals can be achieved at any position in the NFC radiation field formed by the first conductor structure 23, the second conductor structure 24, and the ground plane 22, thereby implementing NFC communication between the electronic device 100 and other electronic devices.

Figure 6:
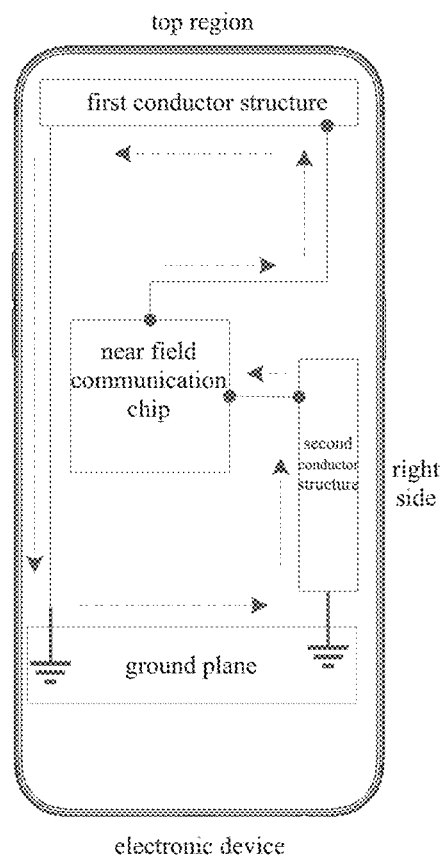
FIG. 6 is a schematic diagram of an arrangement of the antenna device of an electronic device illustrated in FIG. 2.

Please refer to FIG. 6 at the same time. FIG. 6 is a schematic diagram of an arrangement of the antenna device shown in FIG. 2 in an electronic device.

An NFC chip can be integrated on the circuit board of the electronic device. A first conductor structure may be arranged in one end portions of the electronic device. For example, the first conductor structure can be arranged in the top region of the electronic device. A ground plane may be formed on the circuit board of the electronic device. A second conductor structure may be arranged on one side of the electronic device. For example, the second conductor structure may be arranged on the right side of the electronic device. Therefore, a differential excitation current provided by the NFC chip can be transmitted from the NFC chip to the first conductor structure in the top region of the electronic device, then transmitted from the first conductor structure to the ground plane on the circuit board of the electronic device, and then from the ground plane to the second conductor structure on the right side of the electronic device. Finally, it flows back from the second conductor structure to the NFC chip.

The arrangement of the first conductor structure in the top region of the electronic device and the arrangement of the second conductor structure on the right side of the electronic device are merely an example and not intended to limit the embodiments of the present disclosure. The first conductor structure may be arranged in another region of the electronic device, and the second conductor structure may also be arranged in another region of the electronic device, so as to achieve the NFC communication between the electronic device and other electronic devices through different regions of the electronic device. For example, the NFC communication may be achieved through the front side of the electronic device (that is, the side where the display screen of the electronic device is located) and the NFC communication may be also achieved through the back side of the electronic device (that is, the side where the battery cover of the electronic device is located).

When the electronic device radiates an NFC signal to the outside, the NFC chip in the electronic device can actively provide a differential excitation current. When the electronic device serves as an NFC receiver to receive an NFC signal radiated by another electronic device, the antenna device in the electronic device can generate an induced current. The induced current can be understood as a differential excitation current provided by the NFC chip or understood as a differential excitation current passively provided by the NFC chip. That is, no matter the electronic device operates as an NFC transmitter to radiate an NFC signal outwards or operates as an NFC receiver to receive an NFC signal radiated by another electronic device, the NFC chip in the electronic device can provide a differential excitation current.

In the antenna device provided by the embodiment of the present disclosure, two conductor structures are arranged in the antenna device, the two conductor structures are connected to two different ground points on the same ground plane, and a conductive path is formed between the two ground points. Thus, a conductive loop for the transmission of the NFC differential excitation current can be formed through the two conductor structures and the conductive path. Since the two conductor structures are arranged in different regions of the electronic equipment according to the requirements of the design of the internal space of the electronic device and further connected to each other through the conductive path formed on the ground plane to form a loop, the design of the NFC antenna can be accomplished through the conductor structures in different regions of the electronic device and the ground plane, which may save the space occupied by the NFC antenna and cause the layout of the NFC antenna more flexible.

Figure 7:
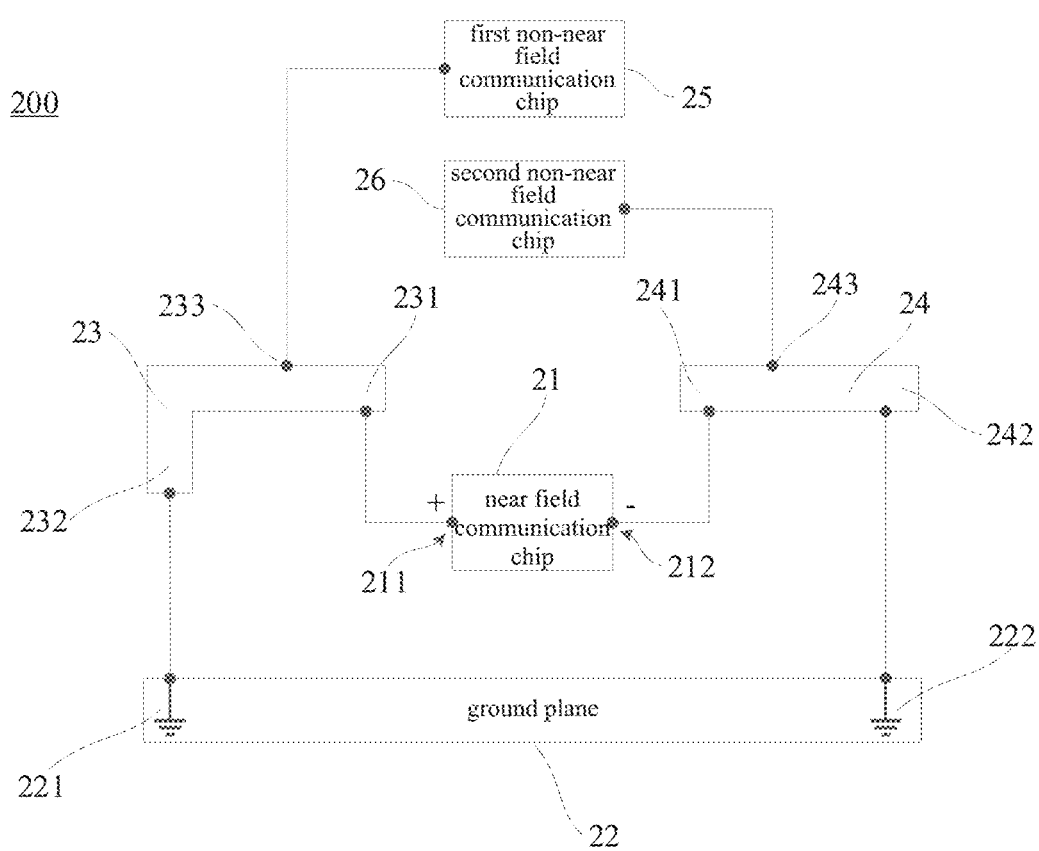
FIG. 7 is a schematic diagram of a second structure of an antenna device according to a second embodiment of the present disclosure.

Please refer to FIG. 7. FIG. 7 is a schematic diagram of the second structure of the antenna device 200 according to an embodiment of the present disclosure. The antenna device 200 further comprises a first non-near field communication chip 25 and a second non-near field communication chip 26. Both the first non-near field communication chip 25 and the second non-near field communication chip 26 can be integrated on the circuit board 30 of the electronic device 100.

The first non-near field communication chip 25 is configured to provide a first non-near field communication excitation signal. Wherein, the first non-near field communication excitation signal is an unbalanced signal. The first non-near field communication excitation signal may comprise one of a cellular network signal, a Wi-Fi signal, a GPS signal, and a BT signal. Correspondingly, the first non-near field communication chip 25 may be a cellular communication chip for providing a cellular network signal; the first non-near field communication chip 25 may be a Wi-Fi chip for providing a Wi-Fi signal; the first non-near field communication chip 25 may be a GPS chip for providing a GPS signal; the first non-near field communication chip 25 may be a BT chip for providing a BT signal.

The first conductor structure 23 further comprises a third feeding end 233. The third feeding end 233 is arranged apart from the first feeding end 231 and the first ground end 232. The third feeding end 233 is electrically connected to the first non-near field communication chip 25, and the first non-near field communication chip 25 is coupled to the ground. Therefore, the first non-near field communication chip 25 can feed the first non-near field communication excitation signal to the first conductor structure 23 through the third feeding end 233. Accordingly, the first conductor structure 23 can be further configured to transmit the first non-near field communication excitation signal.

The first conductor structure 23 is configured to transmit not only the differential excitation current provided by the NFC chip 21 but also the first non-near field communication excitation signal provided by the first non-near field communication chip 25, which realized the multi-purpose of the first conductor structure 23. Thus, the number of conductor structures configured for transmitting wireless signals in the electronic device 100 can is decreased, thereby saving the internal space of the electronic device 100.

The frequency of the NFC signal is usually 13.56 MHz, the frequency of the cellular network signal is usually above 700 MHz, the frequency of the Wi-Fi signal is usually 2.4 GHz or 5 GHz, the frequency of the GPS signal usually comprises multiple frequency bands including 1.575 GHz, 1.227 GHz, 1.381 GHz, 1.841 GHz, etc., the frequency of the BT signal is usually 2.4 GHz. Therefore, compared with the cellular network signal, Wi-Fi signal, GPS signal, and BT signal, the NFC signal is a low-frequency signal, while the cellular network signal, Wi-Fi signal, GPS signal, and BT signal are all high-frequency signals. Alternatively, it may also be understood that the NFC signal is a low-frequency signal, the first non-near field communication excitation signal is a high-frequency signal, and the frequency of the NFC signal is less than the frequency of the first non-near field communication excitation signal.

Moreover, for transmission of a wireless signal, when the frequency of the wireless signal is lower, the required radiator length is longer; and when the frequency of the wireless signal is higher, the required radiator length is shorter. That is, the length of the radiator required to transmit the NFC signal is greater than the length of the radiator required to transmit the first non-near field communication excitation signal.

Therefore, in the first conductor structure 23, the distance between the first feeding end 231 and the first ground end 232 is greater than the distance between the third feeding end 233 and the first ground end 232. Accordingly, in the first conductor structure 23, the length of the radiator for transmitting the NFC signal is greater than the length of the radiator for transmitting the first non-near field communication excitation signal.

In addition, in order to reduce the overall length of the first conductor structure 23, the third feeding end 233 and the first feeding end 231 may be located on the same side of the first ground end 232. That is, the third feeding end 233 is located between the first feeding end 231 and the first ground end 232. Compared with the case in which the third feeding end 233 and the first feeding end 231 is located on different sides of the first ground end 232, the multi-purpose of the portion between the third feeding end 233 and the first ground end 232 can be achieved by locating the third feeding end 233 and the first feeding end 231 on the same side of the first ground end 232, thereby reducing the overall length of the first conductor structure 23 can be reduced.

The second non-near field communication chip 26 is configured to provide a second non-near field communication excitation signal. Wherein, the second non-near field communication excitation signal is an unbalanced signal. The second non-near field communication excitation signal may comprise one of a cellular network signal, a Wi-Fi signal, a GPS signal, and a Bluetooth signal. Correspondingly, the second non-near field communication chip 26 may be a cellular communication chip for providing a cellular network signal; the second non-near field communication chip 26 may be a Wi-Fi chip for providing a Wi-Fi signal; the second non-near field communication chip 26 may be a GPS chip for providing a GPS signal; the second non-near field communication chip 26 may be a BT chip for providing a BT signal.

The second non-near field communication excitation signal and the first non-near field communication excitation signal may be signals of the same communication type or signals of different communication types. Correspondingly, the second non-near field communication chip 26 and the first non-near field communication chip 25 may be chips of the same type or chips of different types.

The second conductor structure 24 further comprises a fourth feeding end 243. The fourth feeding end 243 is arranged apart from the second feeding end 241 and the second ground end 242. The fourth feeding end 243 is electrically connected to the second non-near field communication chip 26, and the second non-near field communication chip 26 is coupled to the ground. Therefore, the second non-near field communication chip 26 can feed the second non-near field communication excitation signal to the second conductor structure 24 through the fourth feeding end 243. Accordingly, the second conductor structure 24 can be further configured to transmit the second non-near field communication excitation signal.

The second conductor structure 24 is configured to transmit not only the differential excitation current provided by the NFC chip 21 but also the second non-near field communication excitation signal provided by the second non-near field communication chip 26, which realized the multi-purpose of the second conductor structure 24. Thus, the number of conductor structures used for transmitting wireless signals in the electronic device 100 can is decreased, thereby saving the internal space of the electronic device 100.

Similarly, in the second conductor structure 24, the distance between the second feeding end 241 and the second ground end 242 is greater than the distance between the fourth feeding end 243 and the second ground end 242. Accordingly, in the second conductor structure 24, the length of the radiator for transmitting the NFC signal is greater than the length of the radiator for transmitting the second non-near field communication excitation signal.

Moreover, in order to reduce the overall length of the second conductor structure 24, the fourth feeding end 243 and the second feeding end 241 may be located on the same side of the second ground end 242. That is, the fourth feeding end 243 is located between the second feeding end 241 and the second ground end 242. Compared with the case in which the fourth feeding end 243 and the second feeding end 241 is located on different sides of the second ground end 242, the multi-purpose of the portion of the fourth feeding end 243 and the second ground end 242 can be achieved by locating the fourth feeding end 243 and the second feeding end 241 on the same side of the second ground end 242, thereby reducing the overall length of the second conductor structure 24 can be reduced.

Figure 8:
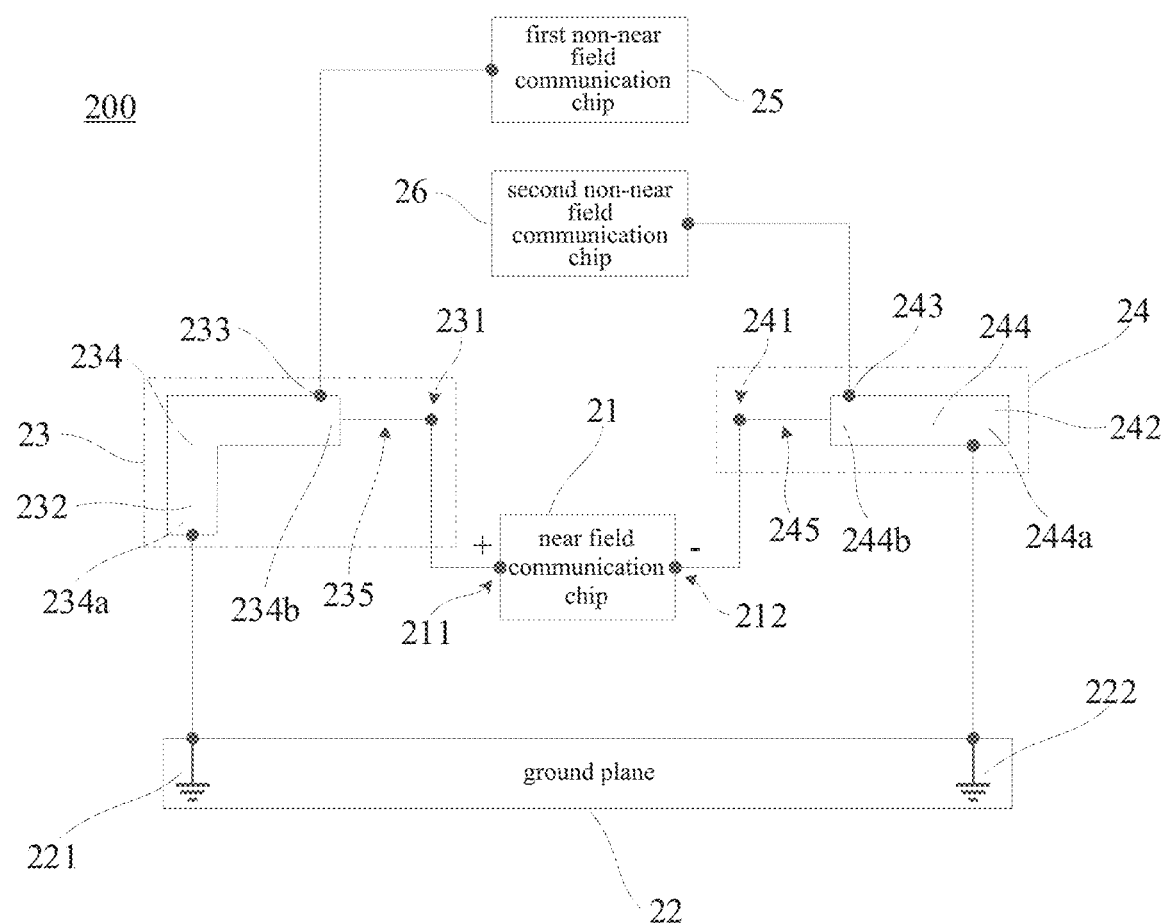
FIG. 8 is a schematic diagram of a third structure of an antenna device according to a third embodiment of the present disclosure.

Please refer to FIG. 8. FIG. 8 is a schematic diagram of a third structure of the antenna device 200 provided by an embodiment of the present disclosure.

The first conductor structure 23 comprises a first resonant arm 234 and a first feeding path 235.

The first resonant arm 234 may be formed by a metal structure in the electronic device 100. For example, a gap may be formed on the middle frame of the housing 20, a metal branch is formed through the gap, and then the first resonant arm 234 is formed by the metal branch. Thus, forming the first resonant arm 234 through the middle frame in the electronic device 100 can ensure that there is a clearance space for the NFC antenna in the electronic device 100 to improve the stability of the NFC signal. Moreover, when the conductor structures at different positions of the middle frame are connected to each other through the conductive path on the ground plane 22, the length of the entire conductive loop can be extended, thereby increasing the effective radiation range of the entire NFC antenna.

For example, the first resonant arm 234 may be formed by a decorative ring of a camera in the electronic device 100. For another example, the first resonant arm 234 may also be formed by a metal wiring on the FPC in the electronic device 100. The FPC may be, for example, an FPC of a display screen, an FPC of a camera, an FPC of a motor, or another structure.

The first resonant arm 234 comprises a first end portion 234a and a second end portion 234b opposite to the first end portion 234a. The first ground end 232 is arranged in the first end portion 234a to achieve the grounding of the first conductor structure 23. The third feeding end 233 is arranged in the second end portion 234b to achieve that the first non-near field communication chip 25 feeds the first non-near field communication excitation signal to the first conductor structure 23.

The first feeding path 235 may be formed by a metal wiring in the electronic device 100. For example, the first feeding path 235 may be formed by a printed wiring on the circuit board 30 in the electronic device 100. For another example, the first feeding path 235 may be formed by a metal wiring in the electronic device 100.

The first feeding path 235 is electrically connected to the second end portion 234b of the first resonant arm 234. The first feeding end 231 is arranged on the first feeding path 235. The first feeding end 231 may be arranged at a terminal of the first feeding path 235 away from the second end portion 234b. Thus, the NFC chip 21 feeding the differential excitation current to the first conductor structure 23 can achieved.

The second conductor structure 24 comprises a second resonant arm 244 and a second feeding path 245.

The second resonant arm 244 may be formed by a metal structure in the electronic device 100. For example, a gap may be formed on the middle frame of the housing 20, a metal branch is formed through the gap, and then the second resonant arm 244 is formed by the metal branch. Similarly, forming the second resonant arm 244 through the middle frame in the electronic device 100 can ensure that there is a clearance space for the NFC antenna in the electronic device 100 to improve the stability of the NFC signal. Moreover, when the conductor structures at different positions of the middle frame are connected to each other through the conductive path on the ground plane 22, the length of the entire conductive loop can be extended, thereby increasing the effective radiation range of the entire NFC antenna.

The second resonant arm 244 may be formed by a decorative ring of a camera in the electronic device 100. For another example, the second resonant arm 244 may also be formed by a metal wiring on the FPC in the electronic device 100. The FPC may be, for example, an FPC of a display screen, an FPC of a camera, an FPC of a motor, or another structure.

The second resonant arm 244 comprises a third end portion 244a and a fourth end portion 244b opposite to the third end portion 244a. The second ground end 242 is arranged in the third end portion 244a to achieve the grounding of the second conductor structure 24. The fourth feeding end 243 is arranged in the fourth end portion 244b to achieve that the second non-near field communication chip 26 feeds the second non-near field communication excitation signal to the second conductor structure 24.

The second feeding path 245 may be formed by a metal wiring in the electronic device 100. For example, the second feeding path 245 may be formed by a printed wiring on the circuit board 30 in the electronic device 100. For another example, the second feeding path 245 may be formed by a metal wiring in the electronic device 100.

The second feeding path 245 is electrically connected to the fourth end portion 244b of the second resonant arm 244. The second feeding end 241 is arranged on the second feeding path 245. For example, the second feeding end 241 may be arranged at a terminal of the second feeding path 245 away from the fourth end portion 244b. Thus, the NFC chip 21 feeding the differential excitation current to the second conductor structure 24 can be achieved.

Figure 9:
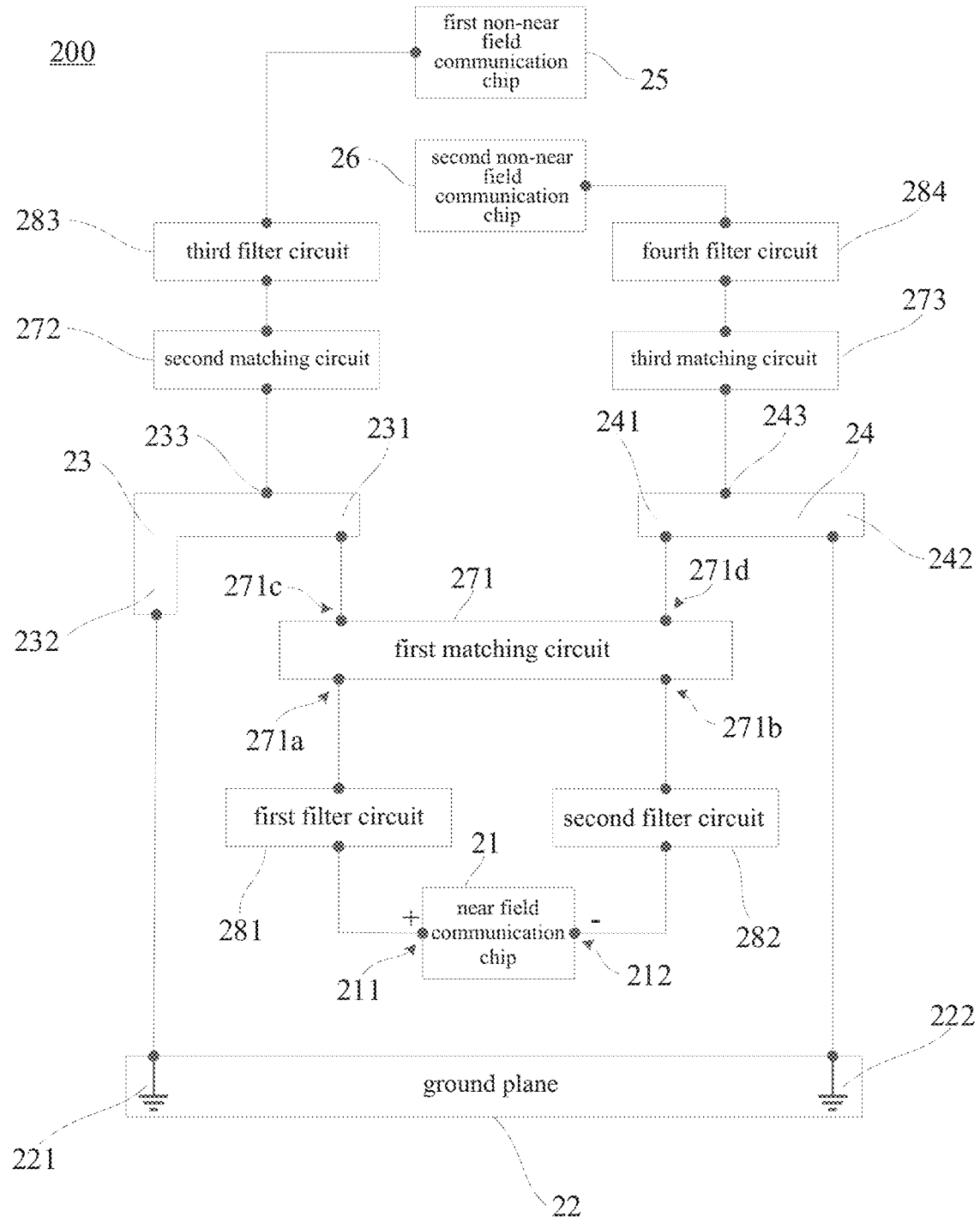
FIG. 9 is a schematic diagram of a fourth structure of an antenna device according to a fourth embodiment of the present disclosure.

Please refer to FIG. 9. FIG. 9 is a schematic diagram of a fourth structure of the antenna device 200 provided by an embodiment of the present disclosure. The antenna device 200 further comprises a first matching circuit 271, a second matching circuit 272, a third matching circuit 273, a first filter circuit 281, a second filter circuit 282, a third filter circuit 283, and a fourth filter circuit 284. The matching circuits can be referred to as matching networks, tuning circuits, tuning networks, and so on. The filter circuits can be referred to as filter networks.

The first matching circuit 271 is electrically connected to the first differential signal port 211 of the NFC chip 21, the second differential signal port 212 of the NFC chip 21, the first feeding end 231 of the first conductor structure 23, and the second feeding end 241 of the second conductor structure 24. The first matching circuit 271 is configured to match the impedance which is induced when the differential excitation current is transmitted in the conductive loop. Wherein, the conductive loop is the conductive loop formed by the first conductor structure 23, the conductive path on the ground plane 22, and the second conductor structure 24.

The first matching circuit 271 comprises a first input port 271a, a second input port 271b, a first output port 271c, and a second output port 271d. The first input port 271a is electrically connected to the first differential signal port 211 of the NFC chip 21. The second input port 271b is electrically connected to the second differential signal port 212 of the NFC chip 21. The first output port 271c is electrically connected to the first feeding end 231 of the first conductor structure 23. The second output port 271d is electrically connected to the second feeding end 241 of the second conductor structure 24.

The first filter circuit 281 is arranged between the first differential signal port 211 of the NFC chip 21 and the first input port 271a of the first matching circuit 271. The first filter circuit 281 is configured to filter a first interference signal between the first differential signal port 211 and the first input port 271a. The first interference signal is an electrical signal other than the differential excitation current provided by the NFC chip 21.

The second filter circuit 282 is arranged between the second differential signal port 212 of the NFC chip 21 and the second input port 271b of the first matching circuit 271. The second filter circuit 282 is configured to filter a second interference signal between the second differential signal port 212 and the second input port 271b. The second interference signal is an electrical signal other than the differential excitation current provided by the NFC chip 21.

The second matching circuit 272 is electrically connected to the first non-near field communication chip 25 and the third feeding end 233 of the first conductor structure 23. The second matching circuit 272 is configured to match the impedance which is induced when the first conductor structure 23 transmits the first non-near field communication excitation signal.

The third filter circuit 283 is arranged between the first non-near field communication chip 25 and the second matching circuit 272. The third filter circuit 283 is configured to filter a third interference signal between the first non-near field communication chip 25 and the second matching circuit 272. The third interference signal is an electrical signal other than the first non-near field communication excitation signal provided by the first non-near field communication chip 25.

The third matching circuit 273 is electrically connected to the second non-near field communication chip 26 and the fourth feeding end 243 of the second conductor structure 24. The third matching circuit 273 is configured to match the impedance which is induced when the second conductor structure 24 transmits the second non-near field communication excitation signal.

The fourth filter circuit 284 is arranged between the second non-near field communication chip 26 and the third matching circuit 273. The fourth filter circuit 284 is configured to filter a fourth interference signal between the second non-near field communication chip 26 and the third matching circuit 273. The fourth interference signal is an electrical signal other than the second non-near field communication excitation signal provided by the second non-near field communication chip 26.

Each of the first matching circuit 271, the second matching circuit 272, and the third matching circuit 273 may comprise a circuit composed of capacitors and inductors connected in series or parallel. Each of the first filter circuit 281, the second filter circuit 282, the third filter circuit 283, and the fourth filter circuit 284 may comprise a circuit composed of capacitors and inductors connected in series or parallel.

Figure 10:
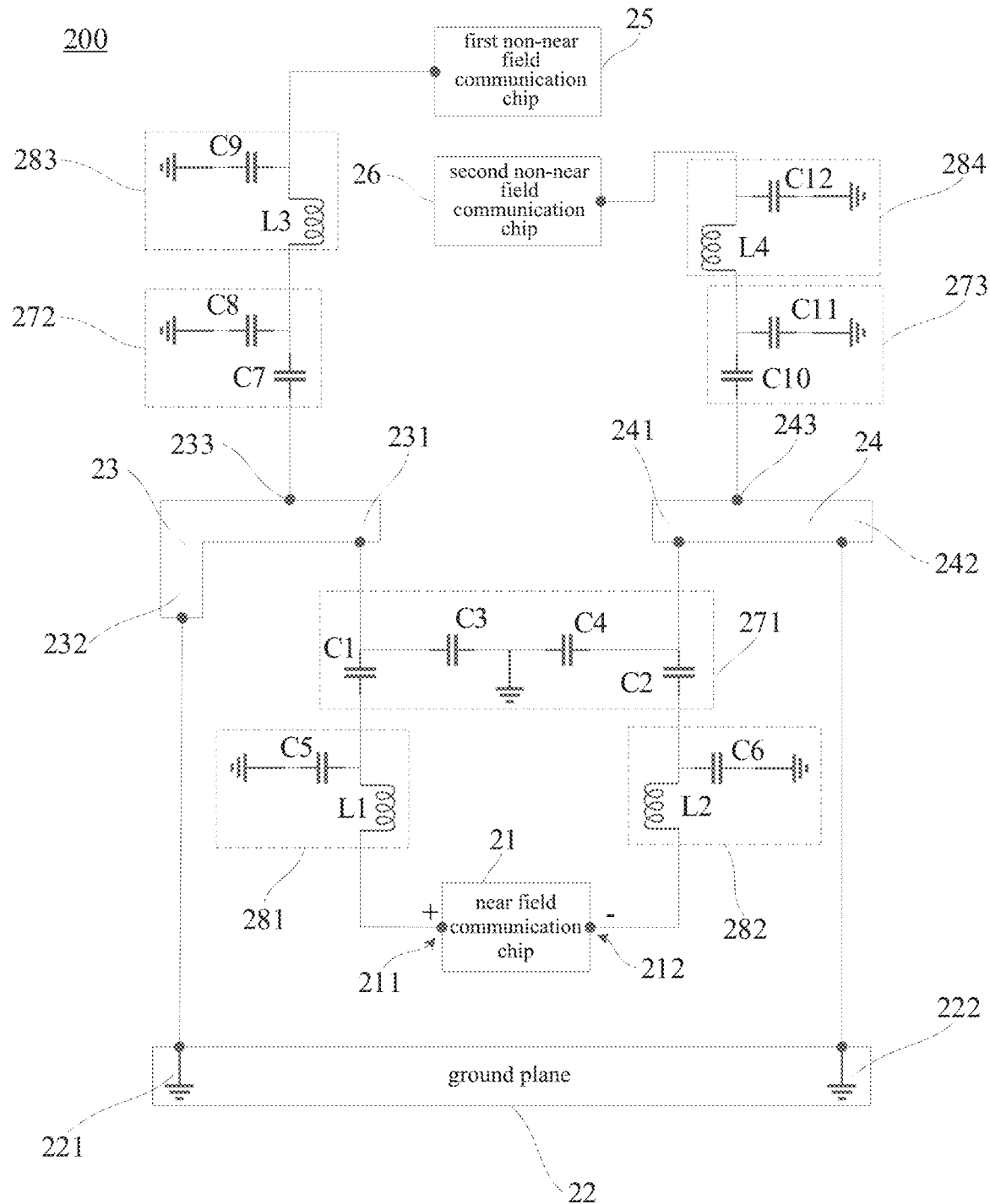
FIG. 10 is a schematic diagram of a fifth structure of an antenna device according to a fifth embodiment of the present disclosure.

Please refer to FIG. 10. FIG. 10 is a schematic diagram of a fifth structure of the antenna device 200 provided by an embodiment of the present disclosure.

The first matching circuit 271 may comprise, for example, four capacitors C1, C2, C3, and C4. Wherein, the capacitor C1 is connected with the first differential signal port 211 of the NFC chip 21 in series. The capacitor C2 is connected with the second differential signal port 212 of the NFC chip 21 in series. The capacitor C3 is connected with the capacitor C4 in series, and the series connection of the capacitors C3 and C4 is connected with the NFC chip 21 in parallel. The common node between the capacitor C3 and the capacitor C4 is coupled to the ground. The capacitance values of the capacitors C1, C2, C3, and C4 can be set according to actual requirements.

The first filter circuit 281 may comprise, for example, an inductor L1 and a capacitor C5. The inductor L1 is connected in series between the first differential signal port 211 and the first matching circuit 271. The capacitor C5 is connected with the NFC chip 21 in parallel and further coupled to the ground. The inductance value of the inductor L1 and the capacitance value of the capacitor C5 can be set according to actual requirement.

The second filter circuit 282 may comprise an inductor L2 and a capacitor C6. The inductor L2 is connected in series between the second differential signal port 212 and the first matching circuit 271. The capacitor C6 is connected with the NFC chip 21 in parallel and further coupled to the ground. The inductance value of the inductor L2 and the capacitance value of the capacitor C6 can be set according to actual requirements.

The second matching circuit 272 may comprise, for example, capacitors C7 and C8. Wherein, the capacitor C7 is connected in series between the third feeding end 233 of the first conductor structure 23 and the first non-near field communication chip 25. The capacitor C8 is connected with the first non-near field communication chip 25 in parallel and further coupled to the ground. The capacitance values of the capacitors C7 and C8 can be set according to actual requirements.

The third filter circuit 283 may comprise an inductor L3 and a capacitor C9. The inductor L3 is connected in series between the first non-near field communication chip 25 and the second matching circuit 272. The capacitor C9 is connected with the first non-near field communication chip 25 in parallel and further coupled to the ground. The inductance value of the inductor L3 and the capacitance value of the capacitor C9 can be set according to actual requirements.

The third matching circuit 273 may comprise, for example, capacitors C10 and C11. The capacitor C10 is connected in series between the fourth feeding end 243 of the second conductor structure 24 and the second non-near field communication chip 26. The capacitor C11 is connected with the second non-near field communication chip 26 in parallel and further coupled to the ground. The capacitance values of the capacitors C10 and C11 can be set according to actual requirements.

The fourth filter circuit 284 may comprise, for example, an inductor L4 and a capacitor C12. The inductor L4 is connected in series between the second non-near field communication chip 26 and the third matching circuit 273. The capacitor C12 is connected with the second non-near field communication chip 26 in parallel and further coupled to the ground. The inductance value of the inductor L4 and the capacitance value of the capacitor C12 can be set according to actual requirements.

The antenna device and electronic device provided in the embodiments of the present disclosure have been described in detail above. Specific examples are used in the disclosure to describe the principle and implementation of the present disclosure.

The description of the above embodiments is only provided for understanding the present disclosure. At the same time, for those skilled in the art, according to the idea of the present disclosure, there will be changes in the specific implementation and the scope of application. In summary, the content of this disclosure should not be construed as a limitation to the present disclosure.

What is claimed is:

1. An antenna device comprising:
   a near field communication chip comprising a first differential signal port and a second differential signal port, the near field communication chip supplying differential excitation current at the first differential signal port and the second differential signal port;
   a ground plane comprising a first ground point and a second ground point arranged at an interval from each other, the ground plane forming a conductive path between the first ground point and the second ground point;
   a first conductor structure comprising a first feeding end and a first ground end arranged at an interval from each other, the first feeding end being electrically connected to the first differential signal port, the first ground end being electrically connected to the first ground point;
   a second conductor structure comprising a second feeding end and a second ground end arranged at an interval from each other, the second feeding end being electrically connected to the second differential signal port, the second ground end being electrically connected to the second ground point; and
   a first matching circuit, comprising a first input port electrically connected to the first differential signal port, a second input port electrically connected to the second differential signal port, a first output port electrically connected to the first feeding end, and a second output port electrically connected to the second feeding end, the first matching circuit being configured to match an impedance which is induced when the differential excitation current is transmitted in the conductive loop,
   wherein the first conductor structure, the conductive path, and the second conductor structure collectively form a conductive loop for transmission of the differential excitation current.

2. The antenna device of claim 1, wherein when the differential excitation current is transmitted in the conductive loop, a first near field communication radiation field generated by the first conductor structure partially overlaps a second near field communication radiation field generated by a second conductor structure.

3. The antenna device of claim 2, wherein the ground plane generates a third near field communication radiation field, the third near field communication radiation field at least partially overlaps the first near field communication radiation field, and the third near field communication radiation field at least partially overlaps the second near field communication radiation field.

4. The antenna device of claim 1, further comprising:
   a first non-near field communication chip for providing a first non-near field communication excitation signal,
   wherein the first conductor structure further comprises a third feeding end, the third feeding end is electrically connected to the first non-near field communication chip, the first conductor structure is further configured to transmit the first non-near field communication excitation signal.

5. The antenna device of claim 4, wherein the third feeding end and the first feeding end are located on the same side of the first ground end, a distance between the first feeding end and the first ground end is greater than a distance between the third feeding end and the first ground end.

6. The antenna device of claim 5, wherein the first conductor structure comprises:
   a first resonant arm comprising a first end portion and a second end portion opposite to the first end portion, the first ground end being arranged in the first end portion, the third feeding end being arranged in the second end portion;
   a first feeding path electrically connected to the second end portion of the first resonant arm, the first feeding end being arranged on the first feeding path.

7. The antenna device of claim 4, further comprising:
   a second non-near field communication chip for providing a second non-near field communication excitation signal,
   wherein the second conductor structure further comprises a fourth feeding end, the fourth feeding end is electrically connected to the second non-near field communication chip, the second conductor structure is further configured to transmit the second non-near field communication excitation signal.

8. The antenna device of claim 7, wherein the fourth feeding end and the second feeding end are located on the same side of the second ground end, a distance between the second feeding end and the second ground end is greater than a distance between the fourth feeding end and the second ground end.

9. The antenna device of claim 8, wherein the second conductor structure comprises:
   a second resonant arm comprising a third end portion and a fourth end portion opposite to the third end portion, the second ground end being arranged in the third end portion, the fourth feeding end being arranged in the fourth end portion;
   a second feeding path electrically connected to the fourth end portion of the second resonant arm, the second feeding end being arranged on the second feeding path.

10. The antenna device of claim 1, further comprising:
    a first filter circuit arranged between the first differential signal port and the first input port;
    a second filter circuit arranged between the second differential signal port and the second input port.

11. The antenna device of claim 4, further comprising a second matching circuit, the second matching circuit being electrically connected to the first non-near field communication chip and the third feeding end, the second matching circuit being configured to match an impedance which is induced when the first conductor structure transmits the first non-near field communication excitation signal.

12. The antenna device of claim 11, wherein further comprising a third filter circuit arranged between the first non-near field communication chip and the second matching circuit.

13. The antenna device of claim 7, further comprising a third matching circuit, the third matching circuit being electrically connected to the second non-near field communication chip and the fourth feeding end, the third matching circuit being configured to match an impedance which is induced when the second conductor structure transmits the second non-near field communication excitation signal.

14. The antenna device of claim 13, further comprising a fourth filter circuit arranged between the second non-near field communication chip and the third matching circuit.

15. An electronic device, comprising an antenna device, the antenna device comprising:
- a near field communication chip comprising a first differential signal port and a second differential signal port, the near field communication chip supplying differential excitation current at the first differential signal port and the second differential signal port;
- a ground plane comprising a first ground point and a second ground point arranged at an interval from each other, the ground plane forming a conductive path between the first ground point and the second ground point;
- a first conductor structure comprising a first feeding end and a first ground end arranged at an interval from each other, the first feeding end being electrically connected to the first differential signal port, the first ground end being electrically connected to the first ground point;
- a second conductor structure comprising a second feeding end and a second ground end arranged at an interval from each other, the second feeding end being electrically connected to the second differential signal port, the second ground end being electrically connected to the second ground point; and
- a first matching circuit, comprising a first input port electrically connected to the first differential signal port, a second input port electrically connected to the second differential signal port, a first output port electrically connected to the first feeding end, and a second output port electrically connected to the second feeding end, the first matching circuit being configured to match an impedance which is induced when the differential excitation current is transmitted in the conductive loop,
- wherein the first conductor structure, the conductive path, and the second conductor structure collectively form a conductive loop for transmission of the differential excitation current.

16. The electronic device of claim 15, further comprising a circuit board, wherein the near field communication chip, the ground plane, and a printed wiring are disposed on the circuit board, and wherein the first conductor structure comprises the printed wiring or the second conductor structure comprises the printed wiring.

17. The electronic device of claim 16, further comprising a flexible circuit board, the flexible circuit board being electrically connected to the board circuit, a metal wiring is arranged on the flexible circuit board, the first conductor structure comprising the metal wiring or the second conductor structure comprising the metal wiring.

18. The electronic device of claim 16, further comprising a middle frame, the circuit board being arranged on the middle frame, the middle frame comprising a first metal branch and a second metal branch, the first conductor structure comprising the first metal branch, the second conductor structure comprising the second metal branch.

* * * * *